(12) United States Patent
Liu et al.

(10) Patent No.: US 9,830,380 B2
(45) Date of Patent: Nov. 28, 2017

(54) MULTIMODALITY-BASED IMAGE TAGGING APPARATUS AND METHOD

(71) Applicant: Fujitsu Limited, Kawasaki-shi, Kanagawa (JP)

(72) Inventors: Xi Liu, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 14/307,687

(22) Filed: Jun. 18, 2014

(65) Prior Publication Data

US 2014/0379730 A1  Dec. 25, 2014

(30) Foreign Application Priority Data

Jun. 24, 2013 (CN) .......................... 2013 1 0251807

(51) Int. Cl.
*G06F 17/30* (2006.01)

(52) U.S. Cl.
CPC .. *G06F 17/30663* (2013.01); *G06F 17/30256* (2013.01); *G06F 17/30017* (2013.01); *G06F 17/3028* (2013.01); *G06F 17/30247* (2013.01); *G06F 17/30259* (2013.01); *G06F 17/30268* (2013.01)

(58) Field of Classification Search
CPC ......... G06F 17/30256; G06F 17/30017; G06F 17/241; G06F 17/3028; G06F 19/321; G06K 9/629; G06K 2209/05; G06K 2209/27; G06K 9/00147; G06K 9/00456
USPC ....... 707/748, 715, 723, 737, 739, 740, 752, 707/772
See application file for complete search history.

(56) References Cited

U.S. PATENT DOCUMENTS

| | | | |
|---|---|---|---|
| 7,242,810 B2* | 7/2007 | Chang | G06K 9/6293 382/159 |
| 7,739,276 B2* | 6/2010 | Lee | G06F 17/30265 707/723 |

(Continued)

FOREIGN PATENT DOCUMENTS

| | | |
|---|---|---|
| CN | 101667263 A | 3/2010 |
| CN | 102414680 A | 4/2012 |

OTHER PUBLICATIONS

P. Gehler et al., "On Feature Combination for Multiclass Object Classification", *IEEE 12th International Conference on Computer Vision (ICCV)*, Oct. 2009, pp. 221-228.

(Continued)

*Primary Examiner* — Dangelino Gortayo
(74) *Attorney, Agent, or Firm* — Staas & Halsey LLP

(57) ABSTRACT

Embodiments provide a multimodality-based image tagging apparatus and a method for the same. The image tagging apparatus includes: a score generating unit configured to generate, for an inquiry image, multiple groups of first scores about all tags in an tagging dictionary by using a training image and multiple modalities of an image; a late-fusion unit configured to fuse the obtained multiple groups of scores to obtain final scores about all the tags; and a tag selecting unit configured to select one or more tag(s) with relatively large tag scores as tag(s) of the inquiry image according to the final scores about all the tags. With the embodiments, multiple modalities may be effectively fused, and a more robust and accurate image tagging result may be obtained.

7 Claims, 8 Drawing Sheets

(56) References Cited

U.S. PATENT DOCUMENTS

| | | | | |
|---|---|---|---|---|
| 8,171,049 | B2* | 5/2012 | Ah-Pine | G06F 17/30274 |
| | | | | 707/723 |
| 8,774,515 | B2* | 7/2014 | Mensink | G06K 9/00624 |
| | | | | 382/128 |
| 8,812,496 | B2* | 8/2014 | Renders | G06F 17/30 |
| | | | | 707/706 |
| 8,923,630 | B2* | 12/2014 | Guo | G06F 17/10 |
| | | | | 382/225 |
| 9,190,026 | B2* | 11/2015 | Yang | G09G 5/24 |
| 2009/0299999 | A1 | 12/2009 | Loui et al. | |
| 2010/0055654 | A1 | 3/2010 | Yokono et al. | |
| 2011/0320454 | A1* | 12/2011 | Hill | G06F 17/30265 |
| | | | | 707/739 |
| 2012/0124029 | A1* | 5/2012 | Kant | G06F 17/3002 |
| | | | | 707/715 |
| 2014/0250120 | A1* | 9/2014 | Mei | G06F 3/0488 |
| | | | | 707/736 |
| 2014/0313222 | A1* | 10/2014 | Anderson | G06F 19/321 |
| | | | | 345/629 |
| 2015/0294194 | A1* | 10/2015 | Znaidai | G06F 17/30253 |
| | | | | 382/190 |

OTHER PUBLICATIONS

X. Li et al., "Learning Social Tag Relevance by Neighbor Voting", *IEEE Transactions on Multimedia*, vol. 11, No. 7, Nov. 2009, pp. 1310-1322.

Chinese Office Action dated Dec. 30, 2016 in corresponding Chinese Patent Application No. 201310251807.8.

* cited by examiner

MULTIMODALITY-BASED IMAGE TAGGING APPARATUS AND METHOD

CROSS REFERENCE TO RELATED APPLICATIONS

This application claims the benefit of Chinese Application No. 201310251807.8, filed Jun. 24, 2013, the disclosure of which is incorporated herein by reference.

TECHNICAL FIELD

The present invention relates to the field of image processing technologies, and in particular to a multimodality-based late-fusion image tagging apparatus and a method for the same.

BACKGROUND

With the rapid development of Web 2.0 technology, a huge amount of images are produced, so that quick browsing and retrieving images to be needed become time consuming and laborious. In order to browsing these images quickly and effectively, image tagging is more and more important and indispensable.

Conventional image tagging methods often consider a single modality. However, a single modality cannot provide sufficient information for featuring an image, and more and more studies show that it is beneficial to consider multiple modalities at the same time. Therefore, an image tagging technology in which multiple modalities of an image are fused becomes more and more important.

A search-based image tagging method is a lately proposed image tagging method for fusing multiple modalities. It first normalizes each of the modalities, then directly concatenates all the normalized modalities to obtain a single modality, and finally find neighboring images by using the concatenated single modality and count tags of all the neighboring images to obtain a final tagging result.

However, the inventors found that the method is simply to directly concatenate all the normalized modalities. Due to measures of the modalities, it is difficult to unify the measures of all the modalities through normalization, thereby being unable to effectively fuse multiple modalities.

It should be noted that the above description of the background is merely provided for clear and complete explanation of the present invention and for easy understanding by those skilled in the art. And it should not be understood that the above technical solution is known to those skilled in the art as it is described in the background of the present invention.

Following documents are listed for the easy understanding of the present invention and conventional technologies, which are incorporated herein by reference as they are fully stated in this text.
1. P. Gehler and S. Nowozin. On feature combination for multiclass object classification, In Proceedings of International Conference on Computer Vision, 2009; and
2. X. Li, C. Snoek, and M. Worring. Learning social tag relevance by neighbor voting, IEEE Transactions on Multimedia, 1310-1322, 2009.

SUMMARY

Embodiments of the present invention provide a multimodality-based image tagging apparatus and a method for the same, with an object being to effectively fuse multiple modalities of an image, so as to obtain a more robust and accurate image tagging result.

According to one aspect of the embodiments of the present invention, there is provided a multimodality-based image tagging apparatus, including:
a score generating unit configured to generate, for an inquiry image, multiple groups of first scores about all tags in a tagging dictionary by using a training image and multiple modalities of an image;
a late-fusion unit configured to fuse the obtained multiple groups of scores to obtain final scores about all the tags; and
a tag selecting unit configured to select one or more tag(s) with relatively large tag scores as tag(s) of the inquiry image according to the final scores about all the tags.

According to another aspect of the embodiments of the present invention, there is provided a multimodality-based image tagging method, including:
generating, for an inquiry image, multiple groups of first scores about all tags in a tagging dictionary by using a training image and multiple modalities of an image;
fusing the obtained multiple groups of scores to obtain final scores about all the tags; and
selecting one or more tag(s) with relatively large tag scores as tag(s) of the inquiry image according to the final scores about all the tags.

The advantage of the embodiments of the present invention resides in that the use of a late fusion manner while using multiple modalities may avoid a problem of measures of the modalities, thereby realizing effective fusion of multiple modalities. With the effective fusion of multiple modalities of an image, a more robust and accurate image tagging result may be obtained over a single-modality-based image tagging method.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

The foregoing and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Embodiment 1

Figure 1:
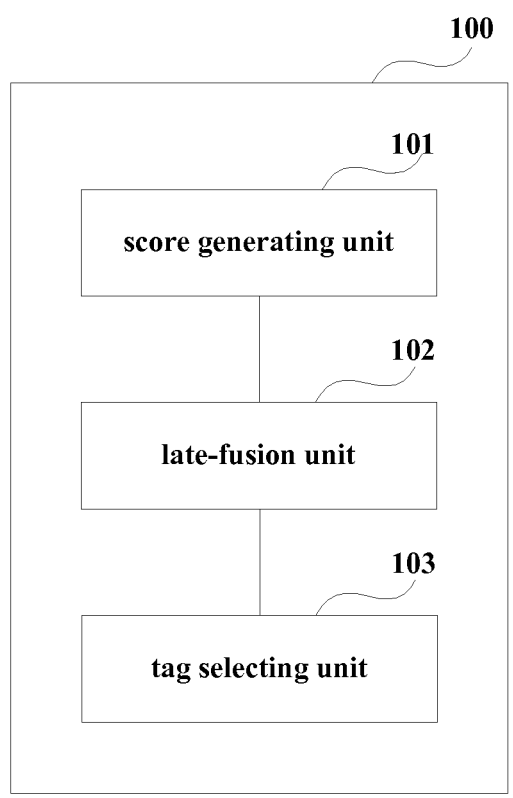
FIG. 1 is a schematic diagram of the structure of an image tagging apparatus of Embodiment 1 of the present invention.

An embodiment of the present invention provides a multimodality-based image tagging apparatus. FIG. 1 is a schematic diagram of the structure of the image tagging apparatus of the embodiment of the present invention. As shown in FIG. 1, the image tagging apparatus 100 includes: a score generating unit 101, a late-fusion unit 102 and a tag selecting unit 103, where the score generating unit 101 is configured to generate, for an inquiry image, multiple groups of scores about all tags in a tagging dictionary by using a training image and multiple modalities of an image; the late-fusion unit 102 is configured to fuse the obtained multiple groups of scores to obtain final scores about all the tags; and the tag selecting unit 103 is configured to select one or more tag(s) with relatively large tag scores as tag(s) of the inquiry image according to the final scores about all the tags.

In this embodiment, one or more tag(s) need(s) to be tagged for an inquiry image, and a tagging dictionary D containing K keywords and an image set T containing N tagging training images may be given, where the K keywords may be taken as candidate tags, each training image Ii=({X1i, X2i, . . . , XMi}, Yi), i=1, . . . , N; {X1i, X2i, . . . , XMi} denoting M modalities of the training image Ii, Yi being a k-dimensional 0-1 vector which denotes tagging information of the training image Ii, Yij=1 denoting that the training image Ii contains a j-th tag, and Yij=0 denoting the training image Ii does not contain the j-th tag, j=1, . . . , K. The tagging dictionary D and the training image set T may be used in the present invention for any inquiry image Iq containing M modalities, so as to automatically derive all the tags of the inquiry image.

It should be noted that for any image, M modalities of the image may be obtained by using the relevant art, hence, both an inquiry image and a training image may have M modalities. The relevant art may be referred to for details of a modality and how to acquire a modality.

In this embodiment, the score generating unit 101 may generate a group of scores about all the tags for each modality, including: calculating k training images most similar to the inquiry image based on a modality; and counting a number of time of occurrence frequencies of each tag from the k training images, and taking a normalized number of time of frequencies of the tag as the group of scores about all the tags in this modality.

In this embodiment, the score generating unit 101 may generate multiple groups of scores, the late-fusion unit 102 may fuse the obtained multiple groups of scores to obtain a group of final scores about all the tags, and the tag selecting unit 103 selects one or more tag(s) with relatively large tag scores as tag(s) of the inquiry image according to the group of final scores about all the tags.

Therefore, different from the relevant art, in the present invention, after the tag scores of multiple modalities are calculated, the multiple modalities are effectively fused in a late-fusion manner, thereby avoiding the problem of measure between the modalities, and a more robust and accurate image tagging result being able to be obtained over a single-modality-based image tagging method.

Embodiment 2

On the basis of Embodiment 1, an embodiment of the present invention provides a multimodality-based image tagging apparatus. The embodiment shall be described below.

Figure 2:
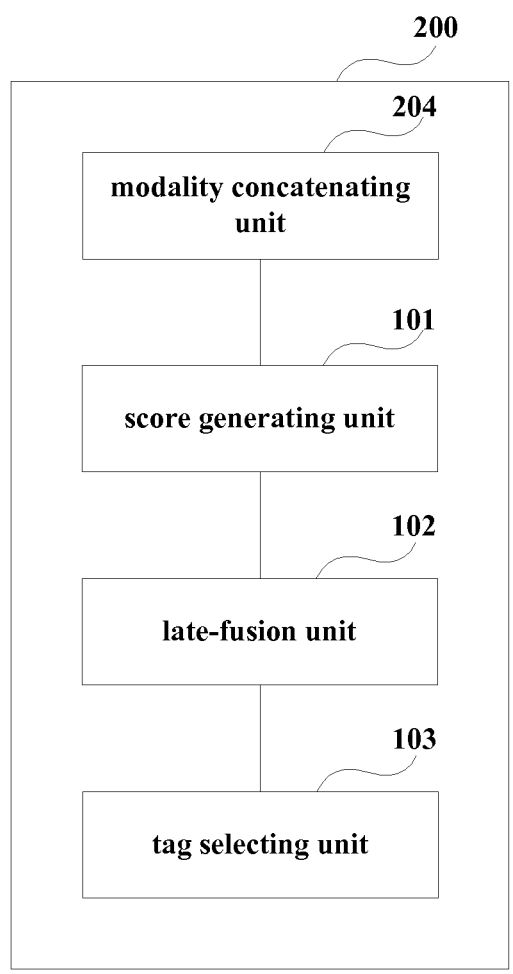
FIG. 2 is a schematic diagram of the structure of an image tagging apparatus of Embodiment 2 of the present invention.

FIG. 2 is another schematic diagram of the structure of the image tagging apparatus of an embodiment of the present invention. As shown in FIG. 2, the image tagging apparatus 200 includes: a score generating unit 101, a late-fusion unit 102 and a tag selecting unit 103, where the score generating unit 101 is configured to generate, for an inquiry image, multiple groups of scores about all tags in a tagging dictionary by using a training image and multiple modalities of an image, as described in Embodiment 1.

As shown in FIG. 2, the image tagging apparatus 200 may further include: a modality concatenating unit 204 configured to directly concatenate all the modalities of the image into a combined modality. And the score generating unit 101 is further configured to generate, for the inquiry image, a group of second scores about all the tags by using the training image and the combined modality, and the late-fusion unit 102 fuses the multiple groups of first scores and the second scores to obtain the final scores about all the tags.

In this embodiment, the late fusion is performed by the multiple groups (such as M groups) of first scores and the group of the second scores, so that the image tagging result is more accurate. The present invention shall be described below in detail taking linear combination performed by the late-fusion unit 102 as an example. It should be noted that the late fusion of the present invention is not limited to linear combination, and other manners of fusion may also be employed, with a particular mode of implementation being determined according to the practical situation.

In particular implementation, the score generating unit 101 may generate a group of tag scores based on each single modality. For example, for a modality t, distances between the inquiry image Iq and all the images in the training image set is calculated according to a distance measure (such as an Euclidean distance, or a cosine distance, etc.), so as to find top k training images Iq1, Iq2, . . . , Iqk having a minimum distance. And occurrence frequencies of all the tags in the k most adjacent training images may be counted according to formula (1), and these frequencies may be taken as the group of scores about all the tags in the modality t.

$$\Sigma_{i \in \{I_{q1}, \ldots, I_{qt}\}} Y_i / k \qquad (1).$$

Each modality of an image may be denoted by a feature vector, and the modality concatenating unit 204 may perform 0-1 normalization on each modality, and then concatenate directly these modalities to obtain a new single modality (a combined modality). And for the concatenated single modality, the score generating unit 101 may calculate distances between the inquiry image Iq and all the images in the training image set according to a distance measure (such as an Euclidean distance, or a cosine distance, etc.), so as to find top k training images Iq1, Iq2, . . . , Iqk having a minimum distance. And likewise, occurrence frequencies of all the tags in the k most adjacent training images may be counted according to formula (1), and these frequencies may be deemed as a group of tag scores generated in a concatenated modality.

In particular implementation, the late-fusion unit 102 may be configured to linearly combine the multiple groups of the first scores, and take the second scores generated by using the combined modality as constraint terms to lead the linear combination.

Assuming that a group of tag scores generated in each single modality t is $TSt=(TSt1, TSt2, \ldots, TStK)$, $t=1, \ldots, M$, a group of tag scores generated in the concatenated modality is $TSa=(TSa1, TSa2, \ldots, TSaK)$. The late-fusion unit 102 may fuse the multiple groups of tag scores through the following steps, so as to generate a group of final scores TSf about all the tags.

In particular, the late-fusion unit 102 may linearly combine all the TSt, $t=1, \ldots, M$, so as to obtain a linearly combined tag score $TS_c = \Sigma_{t=1,\ldots,M} w_t TS_t$; where, TSt is the first score, M is the number of the multiple modalities, and wt is a linear weight, the linear weight $w=(w1, w2, \ldots, wM)^T$ satisfying conditions below:

(1) all the linear weights are greater than or equal to 0, that is, $wt \geq 0$, $t=1, \ldots, M$:

(2) a L2-norm ($\|w\|2$) of the linear weight is as small as possible; and (3) TSc and TSa in the linear combination are as close as possible, TSa being the second score.

In particular, the linear weight w may be obtained by solving the problem below:

$$\min_w \frac{1}{2} w^T w + \frac{\mu}{2} \|TS_c - TS_a\|_2^2 \quad (2)$$
$$\text{s.t. } w_i \geq 0, i = 1, \ldots, M$$

where, μ is a constant given in advance.

The following objective function (3) is obtained by transforming formula (2):

$$\min_w \frac{1}{2} w^T [I + \mu TT^T] w + [(-\mu TT^T)^T] w \quad (3)$$
$$\text{s.t. } w_i \geq 0, i = 1, \ldots, M$$

where, $T=[TS_1^T, TS_2^T, \ldots, TS_M^T]^T$, $T^*=TS_a$, I is an identity matrix, and s.t. denotes that the condition is satisfied. (3) is a standard constrained quadratic programming problem, which may be solved easily. Therefore, the late-fusion unit 102 may obtain final scores about all the tags by fusing the multiple groups of first scores and a group of second scores.

Figure 3:
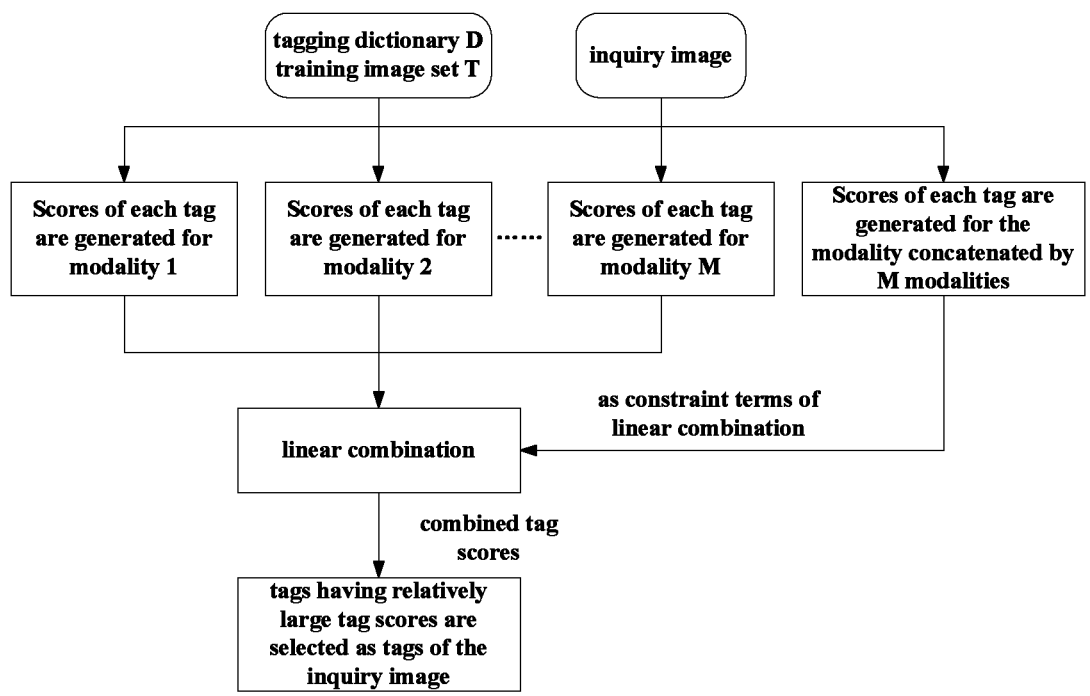
FIG. 3 is a schematic diagram of an image tagging process of Embodiment 2 of the present invention.

FIG. 3 is a schematic diagram of an image tagging process of the embodiment of the present invention. As shown in FIG. 3, for an inquiry image, first scores to which M modalities correspond and a second score to which a combined modality concatenated by M modalities corresponds may be generated by the tagging dictionary D and a training image set T; then multiple groups of the first scores and the second score are fused to generate a group of combined tag scores; and finally one or more tags having relatively large tag scores are selected as tags of the inquiry image.

Figure 4:
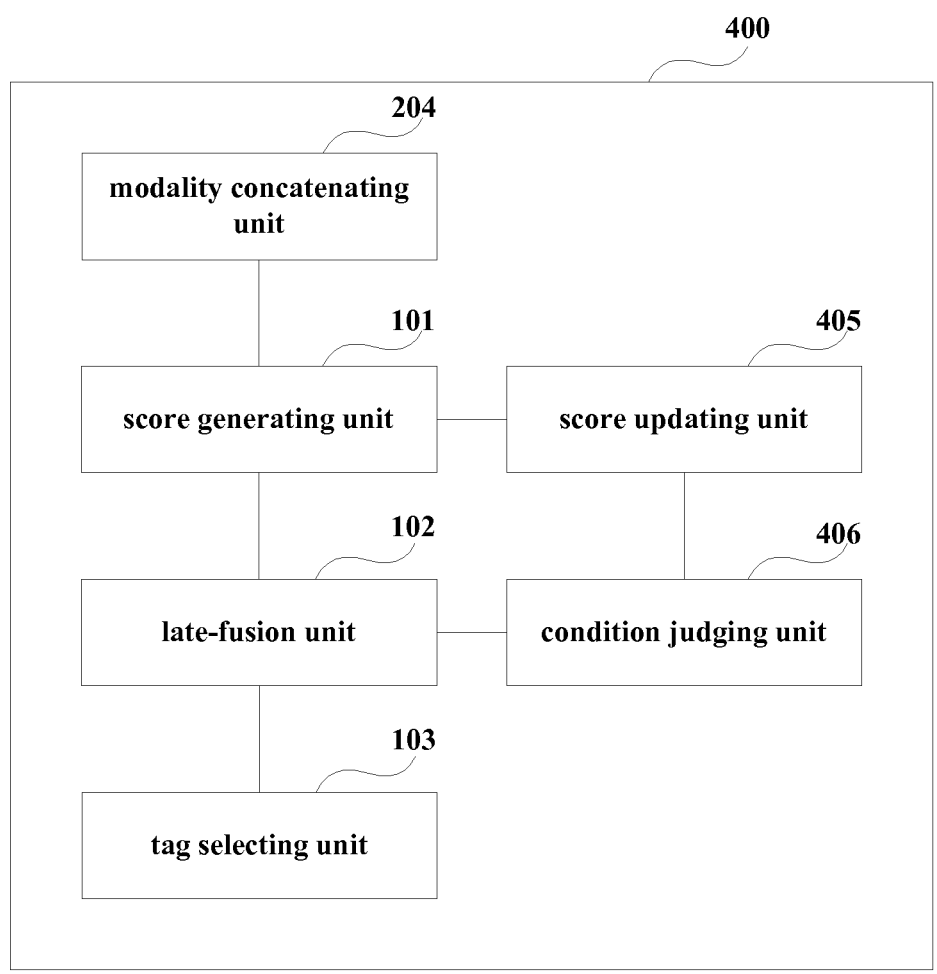
FIG. 4 is another schematic diagram of the structure of the image tagging apparatus of Embodiment 2 of the present invention.

Furthermore, in order that an image tagging result is more robust and accurate, the tag scores may be updated. FIG. 4 is another schematic diagram of the structure of the image tagging apparatus of the embodiment of the present invention. As shown in FIG. 4, the image tagging apparatus 400 includes: a score generating unit 101, a late-fusion unit 102, a tag selecting unit 103 and a modality concatenating unit 204, as described above.

As shown in FIG. 4, the image tagging apparatus 400 further includes a score updating unit 405 configured to update the second score TSa according to the tag score TSc obtained by the linear combination; and the late-fusion unit 102 is further configured to solve the linear weight according to the updated second score TSa, so as to update the tag score TSc obtained by the linear combination.

As shown in FIG. 4, the image tagging apparatus 400 may further include a condition judging unit 406 configured to judge whether a predetermined condition is satisfied; if the predetermined condition is satisfied, the late-fusion unit 102 is further configured to take the obtained tag score TSc as the final scores about all the tags; and if the predetermined condition is not satisfied, the score updating unit 102 proceeds with updating the second score.

In particular implementation, the score updating unit 405 may use a formula below:

$$TS_a = \frac{TS_a + \alpha TS_c}{1 + \alpha}; \quad (4)$$

where, α is a constant. Therefore, the new TSa will update the above-described programming problem (2), and resolve the linearly combined weight w. It should be noted that formula (4) is just a particular mode of implementation of the present invention. However, the present invention is not limited thereto, and other formulae for update may be determined according to the practical situation, or this formula may be properly modified or adjusted.

In this embodiment, the predetermined condition may be, for example, a predetermined time of execution being reached, or variation of the linearly combined tag score TSc being within a predetermined scope (for example, a difference between a TSc obtained this time and a TSc obtained last time being less than a predetermined threshold value), etc. However, the present invention is not limited thereto, and a particular predetermined condition may be determined according to the practical situation.

In this embodiment, the above steps may be repeated, until the predetermined condition is satisfied, and the last linearly combined tag scores TSc may be deemed as the final scores TSf about all the tags. Assuming that the obtained last linearly combined tag scores $TSf=(TSf1, TSf2, \ldots, TSfK)$, they may be ordered in an ascending manner, former kl maximum tag scores are selected, and corresponding kl tags are the tagging results of the inquiry image Iq.

Figure 5:
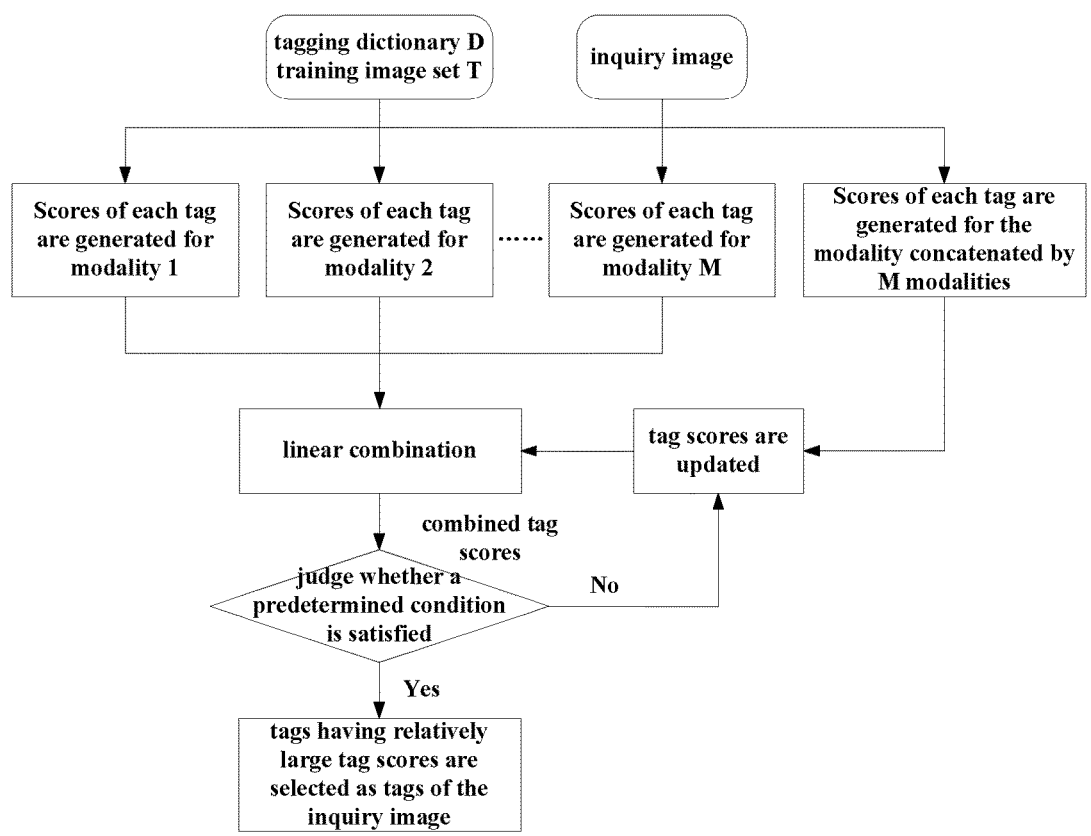
FIG. 5 is another schematic diagram of an image tagging process of Embodiment 2 of the present invention.

FIG. 5 is another schematic diagram of an image tagging process of the embodiment of the present invention. As shown in FIG. 5, for an inquiry image, first scores to which M modalities correspond and a second score to which a combined modality concatenated by M modalities corresponds may be generated by the tagging dictionary D and the training image set T; then multiple groups of the first scores and the second score are fused to generate a group of combined tag scores, where the tag scores may be updated and the linearly combined weight may be resolved; and finally one or more tags having relatively large tag scores are selected as tags of the inquiry image.

In the present invention, multiple modalities are taken into account, and the method is more robust and accurate over a conventional single-modality-based image tagging method; the tag scores generated by multiple modalities are linearly combined in the present invention, and the late-fusion method is more robust and efficient over a conventional fusion method in which all normalized modalities are directly concatenated into a single modality; and furthermore, the present invention is particularly applicable to a web image tagging task, as multiple modalities are more easy to be obtained for a web image.

It can be seen from the above embodiment that the use of a late fusion manner while using multiple modalities may avoid a problem of measures of the modalities, thereby realizing effective fusion of multiple modalities. With the effective fusion of multiple modalities of an image, a more robust and accurate image tagging result may be obtained over a single-modality-based image tagging method.

Embodiment 3

An embodiment of the present invention provides a multimodality-based image tagging method, corresponding to the image tagging apparatus described in Embodiment 1, with the identical contents being not described any further.

Figure 6:
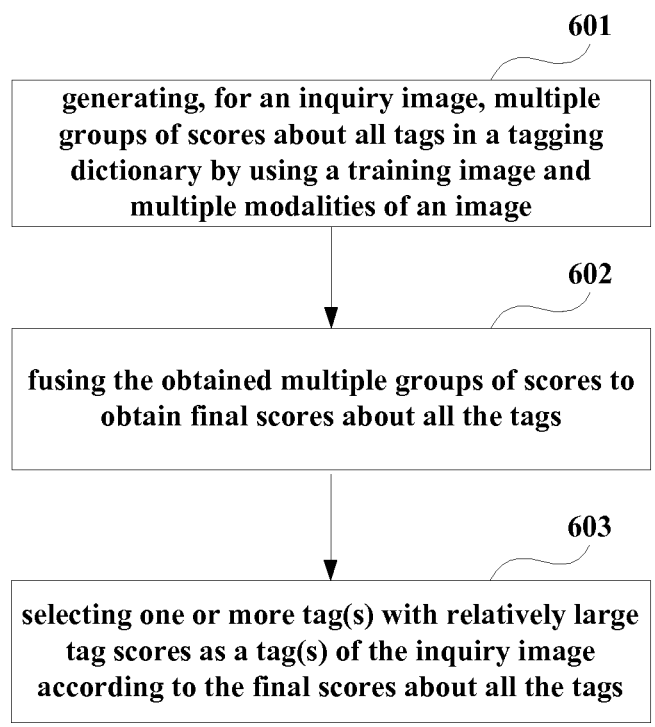
FIG. 6 is a flowchart of an image tagging method of Embodiment 3 of the present invention.

FIG. 6 is a flowchart of the image tagging method of the embodiment of the present invention. As shown in FIG. 6, the image tagging method includes:

step 601: generating, for an inquiry image, multiple groups of scores about all tags in a tagging dictionary by using a training image and multiple modalities of an image;

step 602: fusing the obtained multiple groups of scores to obtain final scores about all the tags; and step 603: selecting one or more tag(s) with relatively large tag scores as the tag(s) of the inquiry image according to the final scores about all the tags.

It can be seen from the above embodiment that the use of a late fusion manner while using multiple modalities may avoid a problem of measures of the modalities, thereby realizing effective fusion of multiple modalities. With the effective fusion of multiple modalities of an image, a more robust and accurate image tagging result may be obtained over a single-modality-based image tagging method.

Embodiment 4

An embodiment of the present invention provides a multimodality-based image tagging method, corresponding to the image tagging apparatus described in Embodiment 2, with the identical contents being not described any further.

Figure 7:
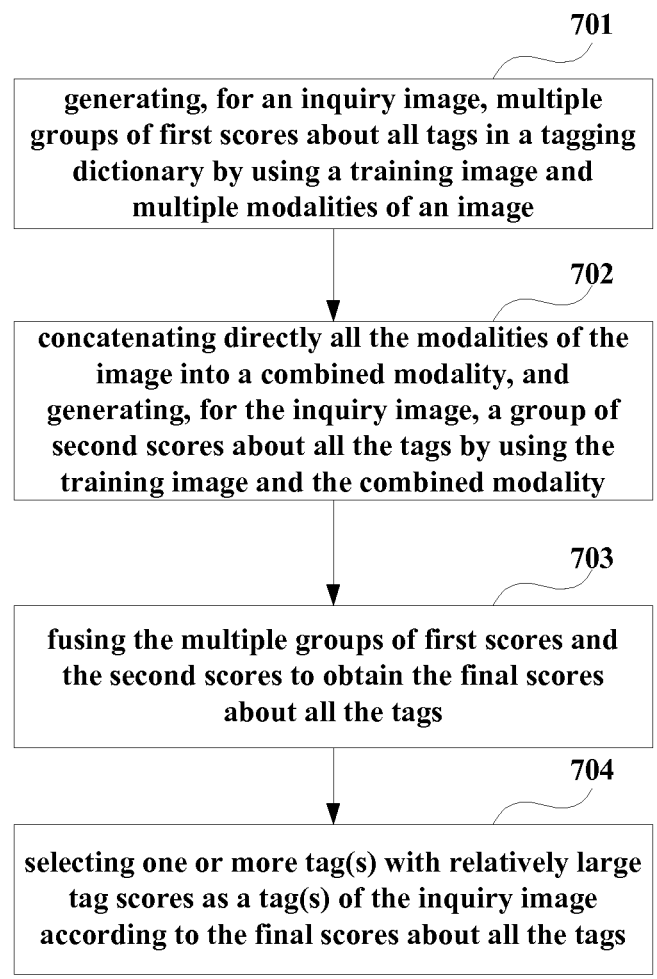
FIG. 7 is a flowchart of an image tagging method of Embodiment 4 of the present invention.

FIG. 7 is a flowchart of the image tagging method of the embodiment of the present invention. As shown in FIG. 7, the image tagging method includes:

step 701: generating, for an inquiry image, multiple groups of first scores about all tags in a tagging dictionary by using a training image and multiple modalities of an image;

step 702: concatenating directly all the modalities of the image into a combined modality, and generating, for the inquiry image, a group of second scores about all the tags by using the training image and the combined modality;

step 703: fusing the multiple groups of first scores and the second scores to obtain the final scores about all the tags; in particular, multiple groups of the first scores may be linearly combined, and the second scores generated by using the combined modality are taken as constraint terms to lead the linear combination; and Embodiment 2 may be referred to for how to calculate; and step 704: selecting one or more tag(s) with relatively large tag scores as tag(s) of the inquiry image according to the final scores about all the tags.

Figure 8:
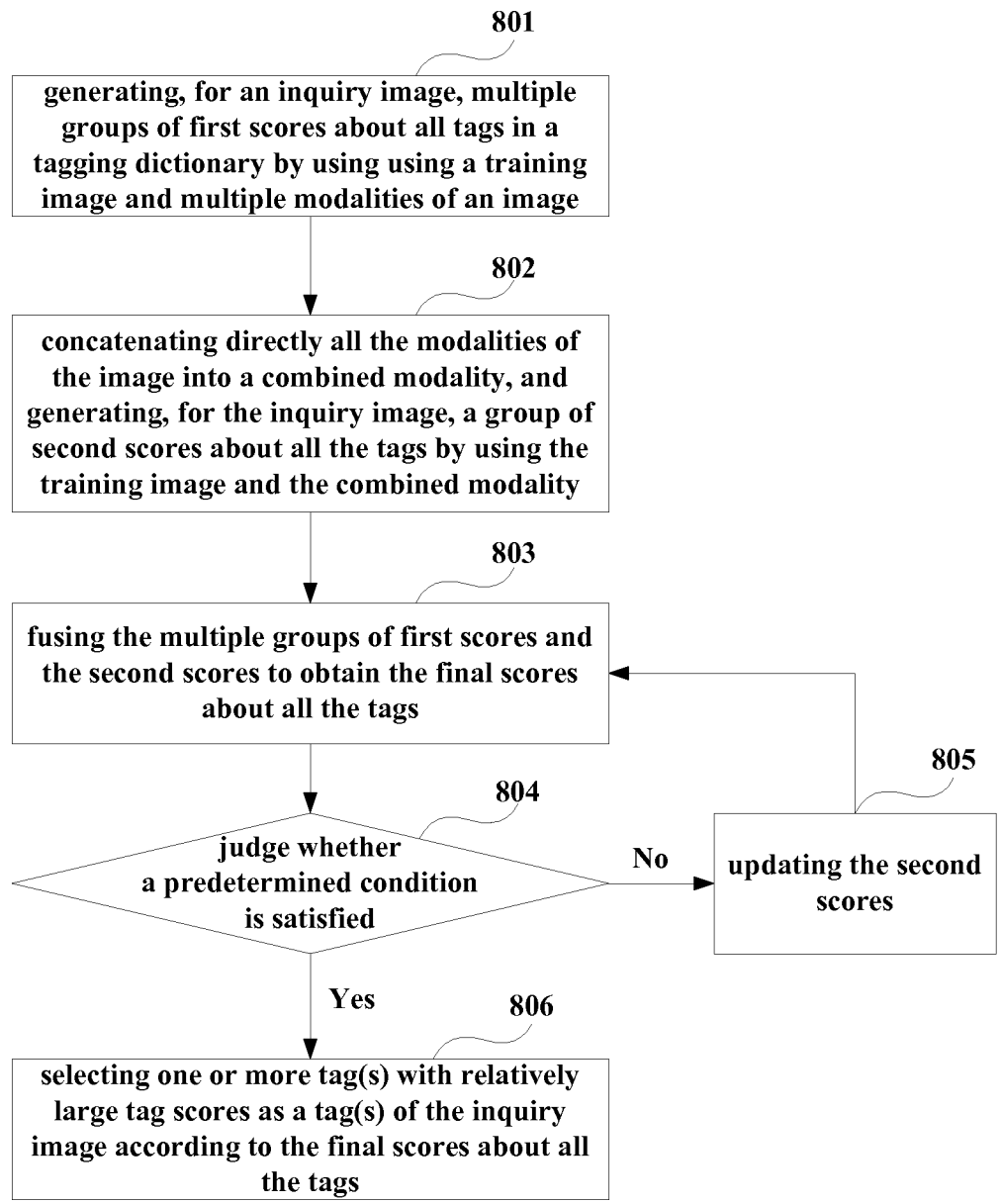
FIG. 8 is another flowchart of the image tagging method of Embodiment 4 of the present invention.

In this embodiment, in order to make the image tagging result more robust and accurate, the tag scores may be updated. FIG. 8 is another flowchart of the image tagging method of the embodiment of the present invention. As shown in FIG. 8, the image tagging method includes:

step 801: generating, for an inquiry image, multiple groups of first scores about all tags in a tagging dictionary by using a training image and multiple modalities of an image;

step 802: concatenating directly all the modalities of the image into a combined modality, and generating, for the inquiry image, a group of second scores about all the tags by using the training image and the combined modality;

step 803: fusing the multiple groups of first scores and the second scores to obtain the final scores about all the tags; in particular, multiple groups of the first scores may be linearly combined, and the second scores generated by using the combined modality are taken as constraint terms to lead the linear combination; and Embodiment 2 may be referred to for how to calculate;

step 804: judge whether a predetermined condition is satisfied; executing step 805 if the predetermined condition is not satisfied; and if the predetermined condition is satisfied, taking the tag scores as the final scores, and then executing step 806;

step 805: updating the second scores, and then re-executing step 803, so as to resolve the linearly combined weight to obtain the scores about all the tags; and Embodiment 2 may be referred to for how to update and how to resolve the linearly combined weight; and step 806: selecting one or more tag(s) with relatively large tag scores as tag(s) of the inquiry image according to the final scores about all the tags.

It can be seen from the above embodiment that the use of a late fusion manner while using multiple modalities may avoid a problem of measures of the modalities, thereby realizing effective fusion of multiple modalities. With the effective fusion of multiple modalities of an image, a more robust and accurate image tagging result may be obtained over a single-modality-based image tagging method.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As for modes of implementation including the above embodiments, following supplements are further disclosed.

Supplement 1. A multimodality-based image tagging apparatus, including:

a score generating unit configured to generate, for an inquiry image, multiple groups of first scores about all tags in a tagging dictionary by using a training image and multiple modalities of an image;

a late-fusion unit configured to fuse the obtained multiple groups of scores to obtain final scores about all the tags; and a tag selecting unit configured to select one or more tag(s) with relatively large tag scores as tag(s) of the inquiry image according to the final scores about all the tags.

Supplement 2. The image tagging apparatus according to supplement 1, where the image tagging apparatus further includes:

a modality concatenating unit configured to directly concatenate all the modalities of the image into a combined modality;

and the score generating unit is further configured to generate, for the inquiry image, a group of second scores about all the tags by using the training image and the combined modality, and the late-fusion unit fuses the multiple groups of first scores and the second scores to obtain the final scores about all the tags.

Supplement 3. The image tagging apparatus according to supplement 2, where the late-fusion unit is configured to linearly combine the multiple groups of the first scores, and take the second scores generated by using the combined modality as constraint terms to lead the linear combination.

Supplement 4. The image tagging apparatus according to supplement 3, where the tag scores obtained by the linear combination in the late-fusion unit is: $TS_c = \Sigma_{t=1,\ldots,M} w_t TS_t$; where, $TS_t$ is the first score, M is the number of the multiple modalities, and $w_t$ is a linear weight, the linear weight satisfying conditions below:

(1) all the linear weights are greater than or equal to 0;
(2) a L2-norm of the linear weight is minimal; and
(3) $TS_c$ and $TS_a$ in the linear combination are as close as possible, $TS_a$ being the second score.

Supplement 5. The image tagging apparatus according to supplement 4, where the linear combination satisfies a constraint below:

$$\min_w \frac{1}{2} w^T w + \frac{\mu}{2} \|TS_c - TS_a\|_2^2$$
$$\text{s.t. } w_i \geq 0, i = 1, \ldots, M$$

where, $w=(w1, w2, \ldots, wM)T$, and $\mu$ is a given constant.

Supplement 6. The image tagging apparatus according to supplement 4, where the image tagging apparatus further includes:

a score updating unit configured to update the second score $TS_a$ according to the tag score $TS_c$ obtained by the linear combination;

and the late-fusion unit is further configured to solve the linear weight w according to the updated second score $TS_a$, so as to update the tag score $TS_c$ obtained by the linear combination.

Supplement 7. The image tagging apparatus according to supplement 6, where the image tagging apparatus further includes:

a condition judging unit configured to judge whether a predetermined condition is satisfied;

and if the predetermined condition is satisfied, the late-fusion unit is further configured to take the obtained tag score $TS_c$ as the final scores about all the tags; and if the predetermined condition is not satisfied, the score updating unit proceeds with updating the second score $TS_a$.

Supplement 8. The image tagging apparatus according to supplement 6, where the score updating unit uses a formula below:

$$TS_a = \frac{TS_a + \alpha TS_c}{1 + \alpha};$$

where, $\alpha$ is a constant.

Supplement 9. A multimodality-based image tagging method, including:

generating, for an inquiry image, multiple groups of first scores about all tags in a tagging dictionary by using a training image and multiple modalities of an image;

fusing the obtained multiple groups of scores to obtain final scores about all the tags; and selecting one or more tag(s) with relatively large tag scores as tag(s) of the inquiry image according to the final scores about all the tags.

Supplement 10. The image tagging method according to supplement 9, where the image tagging method further includes:

concatenating directly all the modalities of the image into a combined modality; and a group of second scores about all the tags is generated for the inquiry image by using the training image and the combined modality, and the multiple groups of first scores and the second scores are fused to obtain the final scores about all the tags.

Supplement 11. The image tagging method according to supplement 10, where the fusing the obtained multiple groups of scores to obtain final scores about all the tags includes:

combining linearly the multiple groups of the first scores, and taking the second scores generated by using the combined modality as constraint terms to lead the linear combination.

Supplement 12. The image tagging method according to supplement 11, where the tag scores obtained by the linear combination is: $TS_c = \Sigma_{t=1,\ldots,M} w_t TS_t$; where, $TS_t$ is the first score, M is the number of the multiple modalities, and $w_t$ is a linear weight, the linear weight satisfying conditions below:

(1) all the linear weights are greater than or equal to 0;
(2) a L2-norm of the linear weight is minimal; and
(3) $TS_c$ and $TS_a$ in the linear combination are as close as possible, $TS_a$ being the second score.

Supplement 13. The image tagging method according to supplement 12, where the linear combination satisfies a constraint below:

$$\min_w \frac{1}{2} w^T w + \frac{\mu}{2} \|TS_c - TS_a\|_2^2$$
$$\text{s.t. } w_i \geq 0, i = 1, \ldots, M$$

where, $w=(w1, w2, \ldots, wM)T$, and $\mu$ is a given constant.

Supplement 14. The image tagging method according to supplement 12, where the image tagging method further includes:

updating the second score TSa according to the tag score TSc obtained by the linear combination;

and the linear weight is solved according to the updated second score TSa, so as to update the tag score TSc obtained by the linear combination.

Supplement 15. The image tagging method according to supplement 14, where the image tagging method further includes:

judging whether a predetermined condition is satisfied;

taking the obtained tag score TSc as the final scores about all the tags if the predetermined condition is satisfied, and proceeding with updating the second score if the predetermined condition is not satisfied.

Supplement 16. The image tagging method according to supplement 14, where a formula below is used in updating the second score TSa according to the tag score TSc obtained by the linear combination:

$$TS_a = \frac{TS_a + \alpha TS_c}{1 + \alpha};$$

where, α is a constant.

Supplement 17. A computer-readable program, where when the program is executed in an image processing apparatus, the program enables a computer to carry out the image tagging method as described in any one of supplements 9-16 in the image processing apparatus.

Supplement 18. A storage medium in which a computer-readable program is stored, where the computer-readable program enables a computer to carry out the image tagging method as described in any one of supplements 9-16 in an image processing apparatus.

Reference will now be made in detail to the embodiments, examples of which are illustrated in the accompanying drawings, wherein like reference numerals refer to the like elements throughout. The embodiments are described below to explain the present invention by referring to the figures.

The invention claimed is:

1. A multimodality-based image tagging apparatus, comprising:
    a memory; and
    a processor coupled to the memory and configured to execute instructions to:
    generate, for an inquiry image, a group of first scores about all tags in a tagging dictionary by using one or more training image(s) and multiple modalities of an image, wherein a group of first scores is generated for each modality;
    directly concatenate all the modalities of the image into a combined modality;
    generate, for the inquiry image, a group of second scores about all the tags by using the training image(s) and the combined modality;
    fuse the obtained multiple groups of first scores and the second scores to obtain final scores about all the tags, wherein the multiple groups of the first scores are linearly combined, and the second scores generated by using the combined modality are taken as constraint terms to lead to the linear combination for the final score to update the tag score; and
    select one or more tag(s) as tag(s) of the inquiry image according to the final scores about all the tags, wherein final score(s) of the selected tag(s) is/are larger than final score(s) of unselected tag(s).

2. The image tagging apparatus according to claim 1, wherein the tag scores obtained by the linear combination is: $TS_c = \Sigma_{t=1,\ldots,M} w_t TS_t$; where, $TS_t$ is the first score, M is the number of the multiple modalities, and $w_t$ is a linear weight, the linear weight satisfying conditions below:
    (1) all the linear weights are greater than or equal to 0;
    (2) a L2-norm of the linear weight is minimal; and
    (3) $TS_c$ and $TS_a$ in the linear combination are as close as possible, $TS_a$ being the second score.

3. The image tagging apparatus according to claim 2, wherein the linear combination satisfies a constraint below:

$$\min_w \frac{1}{2} w^T w + \frac{\mu}{2} \|TS_c - TS_a\|_2^2$$
$$\text{s.t.} \quad w_i \geq 0, i = 1, \ldots, M$$

where, $w = (w_1, w_2, \ldots, w_M)^T$, and μ is a given constant.

4. The image tagging apparatus according to claim 2, wherein the processor further executes the instructions to:
    update the second score $TS_a$ according to the tag score $TS_c$ obtained by the linear combination; and solve the linear weight w according to the updated second score $TS_a$, so as to update the tag score $TS_c$ obtained by the linear combination.

5. The image tagging apparatus according to claim 4, wherein the processor further executes the instruction to:
    judge whether a predetermined condition is satisfied;
    and if the predetermined condition is satisfied, take the obtained tag score $TS_c$ as the final scores about all the tags; and if the predetermined condition is not satisfied, proceeds with updating the second score $TS_a$.

6. The image tagging apparatus according to claim 4, wherein a formula below is used:

$$TS_a = \frac{TS_a + \alpha TS_c}{1 + \alpha};$$

where, α is a constant.

7. A multimodality-based image tagging method, comprising:
    generating, for an inquiry image, a group of first scores about all tags in a tagging dictionary by using one or more training image(s) and multiple modalities of an image, wherein a group of first scores is generated for each modality;
    concatenating directly all the modalities of the image into a combined modality;
    generating, for the inquiry image, a group of second scores about all the tags by using the training image(s) and the combined modality;
    fusing the obtained multiple groups of first scores and the second scores to obtain final scores about all the tags, wherein the multiple groups of the first scores are linearly combined, and the second scores generated by using the combined modality are taken as constraint terms to lead to the linear combination for the final score to update the tag score; and
    selecting one or more tag(s) as tag(s) of the inquiry image according to the final scores about all the tags, wherein final score(s) of the selected tag(s) is/are larger than final score(s) of unselected tag(s).

* * * * *